A. LOEHNER.
Shaft-Hanger Bracket and Post.

No. 227,634.                    Patented May 18, 1880.

Witnesses:
Gilbert B. Towles
W. Burris

Inventor:
Auguste Loehner
By H. A. Daniels
Attorney

UNITED STATES PATENT OFFICE.

AUGUSTE LOEHNER, OF ST. LOUIS, MISSOURI.

SHAFT HANGER, BRACKET, AND POST.

SPECIFICATION forming part of Letters Patent No. 227,634, dated May 18, 1880.

Application filed February 25, 1880.

*To all whom it may concern:*

Be it known that I, AUGUSTE LOEHNER, a citizen of the United States, residing in the city of St. Louis, in the State of Missouri, have invented certain Improvements in Devices for Hanging and Adjusting the Position of Shafting, my device forming a universal bracket-post box.

The object of my invention is to produce a mechanical device by which a shaft can be hung and laid or placed on a vertical, horizontal, or diagonal line readily with precision and with much less labor and loss of time than heretofore required; also, that the shaft-holding box, from its construction, will readily adjust itself to the desired position in the alignment of a shaft, avoiding unnecessary friction in its movement, and the different parts of the bracket, journal-box, and block, from their construction and arrangement, will become adjusted in position in case one post is not exactly in line with another, or a post is not exactly square, or has not a proper plane where the bed-plate of a bracket is attached. Thus the binding of shafts in boxes, friction and heating of journals are avoided.

Figure 1:
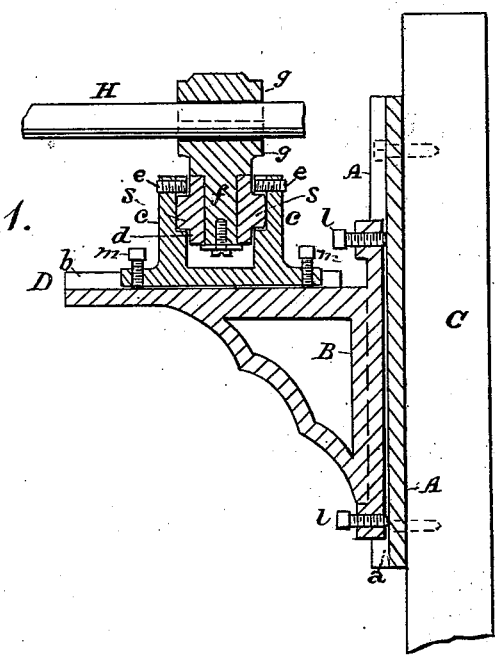
Figure 2:
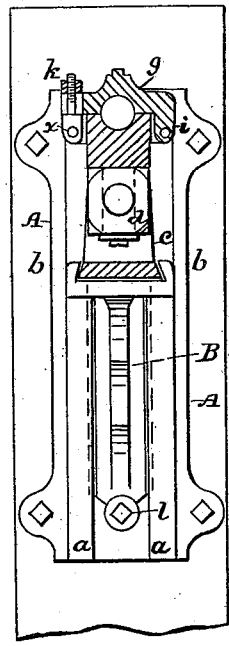
Figure 3:
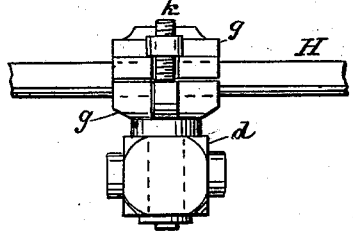
Figure 4:
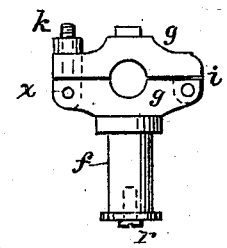

In the accompanying drawings, forming a part of this specification, Figure 1 represents a vertical longitudinal section of my improved shaft hanging and adjusting device. Fig. 2 is a front view of the same, partly in section. Fig. 3 is a detached view of shaft-box and journal-block. Fig. 4 is a detached view of shaft-box provided with a pin.

A designates the base-plate, which is secured to the wall or post C by means of bolts or screws, as nearly as possible to the required elevation of the shaft, said base-plate having a groove or way, either dovetailed or flat, inclined in shape, formed therein to receive the bracket B, which slides therein and conforms thereto. The said bracket is fixed in position with its base between the retaining-flanges $a$ of the plate A by means of the set-screws $l$. Should the post sink or any desired change in the running of the shaft become necessary, the screws $l$ have to be loosened, the position of the bracket changed as desired, and the screws again forced against the plate A.

In the top plate of the bracket B is also a groove with retaining-flanges $b$, similar to that in the plate A, in which the housing $c$ slides in a horizontal movement to place the shaft in the desired line. The said housing is made fast in position at the proper point by forcing the set-screws $m$ against the bed of the groove in the plate D of the bracket.

Within the housing $c$ is placed the journal-block $d$, which has bearings $s$ in vertical grooves in the housing, the journals being inserted at the top, and then secured against lifting or falling out by the screw-pins $e$ over the journals, as seen in Fig. 1. The journal-block $d$ is formed, either in casting or by drilling, with a vertical hole through it at the center, to receive the pin $f$ of the shaft-box $g$, the pin being passed through the block and usually secured in place by a washer and screw, $r$.

The shaft-holding-box $g$ has its upper and lower parts hinged together at $i$, and is formed to receive the shaft H. The shaft-box is also provided with a screw-bolt, which turns on a pin at $x$, like a hinge, so that by means of a nut, $k$, the two parts of the box are readily locked.

To open the box it is simply necessary to loosen the nut $k$, when the hinged bolt falls over, and the hinged cover may be readily lifted, there being no unnecessary handling of bolts or detached parts of the box, which usually takes considerable time in using other shaft-holding devices.

By the whole construction and arrangement—the base-plate A allowing a vertical adjustment of the bracket, the grooved bracket allowing a horizontal adjustment of the housing, the journal-block turning on its bearings in the housing, and the shaft-box turning laterally on the journal-block—the shaft may be supported at any desired elevation and adjusted at any angle on a vertical, horizontal, or diagonal line.

I claim—

1. In a shaft-hanging device, the grooved base-plate A and the bracket adjustable thereon, the bracket having a grooved plate at right angles with the base-plate, to receive a shaft-holding device which is adjustable thereon, substantially as set forth.

2. In a shaft-hanging device, a shaft-holding box mounted upon a journal-block, with bearings, as shown, so that said box has a turning movement on the journal-block, for the purposes set forth.

3. The shaft-box provided with the pin $f$, and the journal-block to receive the same, said block having bearings in the movable housing, substantially as set forth.

4. In a shaft hanging and adjusting device, the shaft-box provided with pin $f$, the journal-block having bearings in the housing, the latter being adjustable on a grooved plate of the bracket, substantially as set forth and described.

St. Louis, February 1, 1880.

AUGUSTE LOEHNER.

Witnesses:
BRITTON A. HILL,
FRANK J. DONOVAN.